(12) United States Patent
Heilfort

(10) Patent No.: US 10,350,985 B2
(45) Date of Patent: Jul. 16, 2019

(54) DRIVE TRAIN OF A HYBRID MOTOR VEHICLE

(71) Applicant: Dr. Ing. h.c. F. Porsche Aktiengesellschaft, Stuttgart (DE)

(72) Inventor: Falk Heilfort, Eberdingen (DE)

(73) Assignee: Dr. Ing. h.c. F. Porsche Aktiengesellschaft (DE)

(*) Notice: Subject to any disclaimer, the term of this patent is extended or adjusted under 35 U.S.C. 154(b) by 432 days.

(21) Appl. No.: 15/021,999

(22) PCT Filed: Jun. 24, 2014

(86) PCT No.: PCT/EP2014/001702
§ 371 (c)(1),
(2) Date: Mar. 15, 2016

(87) PCT Pub. No.: WO2015/051860
PCT Pub. Date: Apr. 16, 2015

(65) Prior Publication Data
US 2016/0221431 A1    Aug. 4, 2016

(30) Foreign Application Priority Data

Oct. 9, 2013   (DE) .................. 10 2013 111 148

(51) Int. Cl.
| | | |
|---|---|---|
| *B60K 6/50* | (2007.10) | |
| *B60K 6/40* | (2007.10) | |
| *B60K 6/442* | (2007.10) | |
| *B60K 6/52* | (2007.10) | |
| *B60K 6/547* | (2007.10) | |
| *B60K 1/02* | (2006.01) | |

(52) U.S. Cl.
CPC ................. *B60K 6/50* (2013.01); *B60K 6/40* (2013.01); *B60K 6/442* (2013.01); *B60K 6/52* (2013.01);
(Continued)

(58) Field of Classification Search
None
See application file for complete search history.

(56) References Cited

U.S. PATENT DOCUMENTS

| | | |
|---|---|---|
| 7,611,495 B1 | 11/2009 | Gianturco |
| 8,439,147 B2 | 5/2013 | Fuechtner et al. |
| | (Continued) | |

FOREIGN PATENT DOCUMENTS

| | | |
|---|---|---|
| DE | 199 39 814 | 2/2001 |
| DE | 10 2005 035 328 | 3/2007 |
| | (Continued) | |

OTHER PUBLICATIONS

International Search Report.
German Search Report dated Jun. 25, 2014.
Chinese Office Action dated Jul. 27, 2017.

*Primary Examiner* — William Kelleher
*Assistant Examiner* — Gregory T Prather
(74) *Attorney, Agent, or Firm* — Gerald E. Hespos; Michael J. Porco; Matthew T. Hespos

(57) ABSTRACT

A drive train of a hybrid motor vehicle has an internal combustion engine (4), at least one first electric motor (16), at least a first clutch arrangement (6), at least one gear assembly (8), a storage arrangement and at least one auxiliary unit, such as an air conditioning compressor. The internal combustion engine (4) is connected drivingly to a first drive axle (14) via the clutch arrangement (6) and the gear assembly (8), and the first electric motor (16) is connected drivingly to a second drive axle (22) and to the storage arrangement and/or the auxiliary unit. The first electric motor (16) has a rotor shaft (36) with a first end (34) drivingly connected to the second drive axle (22) by a first switching unit (18) and a second end (38) drivingly con-
(Continued)

nected to a crankshaft (28) of the internal combustion engine (4) by a second switching unit (24).

9 Claims, 1 Drawing Sheet

(52) U.S. Cl.
CPC ............... B60K 6/547 (2013.01); *B60K 1/02* (2013.01); *B60Y 2200/92* (2013.01); *B60Y 2400/70* (2013.01); *B60Y 2400/82* (2013.01); *B60Y 2400/88* (2013.01); *Y02T 10/6234* (2013.01); *Y02T 10/6265* (2013.01); *Y10S 903/915* (2013.01); *Y10S 903/916* (2013.01)

(56) References Cited

U.S. PATENT DOCUMENTS

| | | |
|---|---|---|
| 2007/0022835 A1 | 2/2007 | Kilian et al. |
| 2007/0087886 A1* | 4/2007 | Rosemeier ........... B60K 17/344 475/6 |
| 2009/0197728 A1 | 8/2009 | Janson |
| 2009/0200094 A1 | 8/2009 | Zöhrer et al. |
| 2011/0094809 A1 | 4/2011 | Poschmann et al. |
| 2012/0006152 A1* | 1/2012 | Fuechtner .............. B60K 6/448 74/640 |
| 2012/0312621 A1 | 12/2012 | Fuechtner et al. |
| 2013/0296136 A1* | 11/2013 | Doering ................. B60K 6/48 477/167 |
| 2014/0299395 A1* | 10/2014 | Roth ....................... B60K 6/44 180/65.225 |
| 2017/0305260 A1* | 10/2017 | Ruan ...................... B60K 6/36 |

FOREIGN PATENT DOCUMENTS

| | | |
|---|---|---|
| DE | 10 2005 049 707 | 4/2007 |
| DE | 10 2009 050 957 | 5/2011 |
| DE | 10 2010 013 345 | 10/2011 |
| DE | 10 2010 036 321 | 1/2012 |
| DE | 10 2012 218 120 | 4/2014 |
| JP | 2011-11573 | 1/2011 |
| JP | 2012-18379 | 9/2012 |

* cited by examiner

DRIVE TRAIN OF A HYBRID MOTOR VEHICLE

BACKGROUND

1. Field of the Invention

The invention relates to a drive train of a hybrid motor vehicle having an internal combustion engine, at least one first electric motor, at least one first clutch arrangement and at least one transmission arrangement, with a storage arrangement and at least one auxiliary unit, such as for example an air conditioning compressor, wherein the internal combustion engine is drivingly connected to a first drive axle by means of the clutch arrangement and the transmission arrangement, and the first electric motor is drivingly connected to a second drive axle and to the storage arrangement and/or the auxiliary unit.

2. Description of the Related Art

DE 10 2009 050 957 A1 discloses a drive train in which an internal combustion engine is connected drivingly to a first drive axle, in this case the rear axle, and an electric motor is connected drivingly to a second drive axle, in this case the front axle. In this way, it is possible to drive the motor vehicle conventionally solely by means of the internal combustion engine, to drive it both by means of the electric motor and the internal combustion engine in the hybrid mode, or to drive only the front axle, i.e. to drive it purely by electric motor. However, the arrangement shown in DE 10 2009 050 957 A1 disadvantageously requires a very large amount of installation space and has a very low efficiency, especially as regards the electric motor.

It is therefore the object of the invention to avoid the abovementioned disadvantages and to provide a drive train that can be controlled with the greatest possible flexibility as regards the drive concepts while requiring very little installation space.

SUMMARY

The invention relates to a drive train in which an internal combustion engine is connected drivingly to a first drive axle. The drive train further has a first electric motor. The first electric motor has a rotor shaft with a first end that is connected drivingly to the second drive axle by means of a first selector unit and a second end that is connected drivingly to a crankshaft of the internal combustion engine by means of a second selector unit. This is a simple way of enabling the first electric motor to be arranged parallel to the internal combustion engine, thereby delivering significant packaging advantages. Moreover, the first electric motor is arranged in immediate proximity to the second drive axle, e.g. the front axle, and is connected drivingly directly to the front axle only by means of a first selector unit, e.g. by means of a front axle differential. The driving connection of the first electric motor to the crankshaft can drive auxiliary units, e.g. an air-conditioning compressor. It is also a simple matter to carry out engine starting of the internal combustion engine by means of the first electric motor. In both cases, this takes place with the second selector unit closed. When the first selector unit is open and the second selector unit is closed, the internal combustion engine can drive the first electric motor, which is being operated as a generator, while the motor vehicle is stationary in order to generate power and charge a storage arrangement (stationary charging). The electric machine can also be operated as a generator when the first selector unit is closed and the second selector unit is open in order to generate power at the front axle by using the kinetic energy of the rolling motor vehicle (energy recovery).

In a particularly advantageous embodiment, a second electric motor is provided and is connected drivingly to the first drive axle by means of a third selector unit downstream of the transmission arrangement. Since the second electric motor is connected drivingly directly, e.g. by means of a Cardan shaft and by means of a differential, to the first drive axle, e.g. the rear axle, there are no longer any losses due to the interposed transmission arrangement. As a result, the efficiency of the second electric motor is increased considerably. Moreover, a purely electric all-wheel concept can be implemented by means of a relatively simple embodiment of the drive train of this kind. As an alternative, it is, of course, also possible to provide a second electric motor that is connected drivingly to an input shaft of the first clutch arrangement upstream of the first clutch arrangement. In this embodiment, a second clutch arrangement optionally can be provided between the second electric motor and the first clutch arrangement.

The driving connection between the first electric motor and the crankshaft can advantageously be established by means of a belt drive.

BRIEF DESCRIPTION OF THE DRAWING

The invention is explained in greater detail below by means of a drawing, in which the single FIGURE shows a schematic view of a drive train according to the invention.

DETAILED DESCRIPTION

Figure 1:
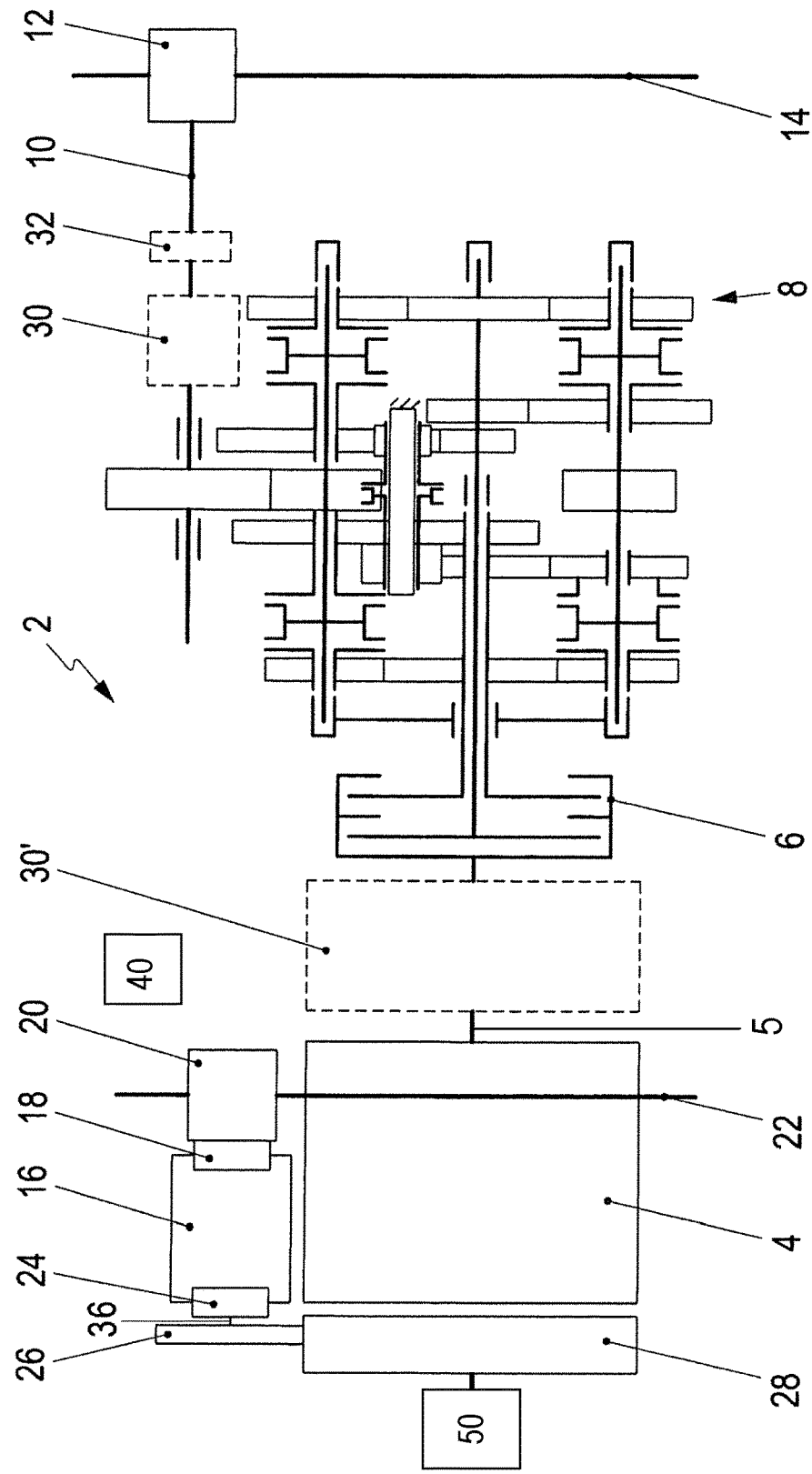

The single FIGURE shows a schematic view of a drive train 2 for a hybrid motor vehicle (not shown further). The drive train 2 has an internal combustion engine 4 with a drive shaft 5 that is connected by means of a clutch arrangement 6, in this case a dual clutch, and a transmission 8 and a Cardan shaft 10 to a first differential 12 of a first drive axle 14, in this case the rear drive axle. The clutch arrangement 6, in this embodiment, is a dual clutch. No further details will be given here of the particular embodiment of the transmission arrangement 8. A first electric motor 16 is provided parallel to the internal combustion engine 4 and selectively is connected drivingly by means of a first selector unit 18 and a differential 20 to a second drive axle 22, in this case the front wheel axle. Moreover, the electric motor 16 selectively is connected by means of a second selector unit 24 and a belt drive 26 to a crankshaft 28 of the internal combustion engine 4. The electric motor 16 has a rotor shaft 36 with a first end that selectively is connected drivingly to the front wheel axle 22 by means of the first selector unit 18. The second selector unit 24 for coupling the belt drive 26 to the crankshaft 28 of the internal combustion engine 4 selectively engages on a second end of the rotor shaft 36 via the second selector unit 24.

Various drive concepts of the drive train 2 according to the invention are explained below. In addition to the conventional driving of the rear axle 14 by the internal combustion engine 4, the motor vehicle can also be driven purely by electric motor, by means of the first electric motor 16, when the first selector unit 18 is closed and the second selector unit 24 is open. When the internal combustion engine 4 also is selected, the motor vehicle can likewise also be operated in the all-wheel mode. When the first selector unit 18 is open and the second selector unit 24 is closed and an internal combustion engine 4 is being operated in the idling mode, the first electric motor 16 can be operated as a generator, and can charge a storage arrangement or battery 40 (stationary charging). When the first selector unit 18 is closed and the second selector unit 24 is open, the first electric motor 16 can likewise be operated in the energy recovery mode. When the first selector unit 18 is open and the second selector unit 24 is closed, the first electric motor 16 can furthermore drive the crankshaft 28 and thus, where applicable, auxiliary units 50, such as for example an air conditioning compressor, by means of the belt drive 26. It is also possible in this way to use the first electric motor 16 as a starter for engine starting the internal combustion engine 4.

In another advantageous embodiment, a second electric motor 30 downstream of the transmission arrangement 8 is connected drivingly to the rear axle differential 12 and hence to the rear axle 14 by means of a third selector unit 32. The illustration in dashed lines of the second electric motor 30 and of the third selector unit 32 is intended to express the fact that these design elements are not necessarily required to implement the invention. Such an arrangement of the second electric motor 30 is a simple way of operating the vehicle by electric motor in the all-wheel mode. The efficiency of the second electric motor 30 is not reduced by the transmission arrangement 8.

As an alternative, it is, of course, also possible to provide a second electric motor 30' for driving the rear axle 14 upstream of the first clutch arrangement 6 and to connect it drivingly to an input shaft of the first clutch arrangement 6. It is conceivable here for a second clutch arrangement (known per se) for the second electric motor 30' to be omitted.

The invention claimed is:

1. A drive train of a hybrid motor vehicle comprising: an internal combustion engine (4) with a drive shaft (5), at least one first electric motor (16), at least one first clutch arrangement (6), at least one transmission arrangement (8), a storage arrangement (40) and at least one auxiliary unit (50), the internal combustion engine (4) being connected drivingly to a first drive axle (14) by means of the clutch arrangement (6) and the transmission arrangement (8), and the first electric motor (16) selectively being connected to one of a second drive axle (22) and to the storage arrangement (40) and/or the auxiliary unit (50), the first electric motor (16) having a rotor shaft (36) aligned parallel to the drive shaft (5) of the internal combustion engine (4) with the rotor shaft (36) having a first end selectively connected drivingly to the second drive axle (22) by means of a first selector unit (18) and at a second end selectively connected drivingly to a crankshaft (28) of the internal combustion engine (4) by means of a second selector unit (24).

2. The drive train of claim 1, further comprising a second electric motor (30) drivingly connected to the first drive axle (14) by means of a third selector unit (32) downstream of the transmission arrangement (8).

3. The drive train of claim 1, further comprising a second electric motor (30') drivingly connected to an input shaft of the first clutch arrangement (6) upstream of the first clutch arrangement (6).

4. The drive train of claim 3, further comprising a second clutch arrangement between the second electric motor (30') and the first clutch arrangement (6).

5. The drive train of claim 1, wherein the driving connection between the first electric motor (16) and the crankshaft (28) is established by a belt drive (26).

6. The drive train of claim 1, wherein the at least one auxiliary unit comprises an air conditioning compressor.

7. The drive train of claim 1, wherein the rotor shaft (36) of the first electric motor (16) is offset laterally from the drive shaft (5) of the internal combustion engine (4).

8. The drive train of claim 1, wherein the first electric motor (16) is offset laterally from the internal combustion engine (4).

9. The drive train of claim 8, wherein the first electric motor (16) and the internal combustion engine (4) are aligned with or forward of a front axle of the hybrid motor vehicle.

* * * * *